April 28, 1925.
E. A. BAYLES
1,535,711
MANUFACTURE OF ELECTRIC CABLES
Filed April 10, 1924
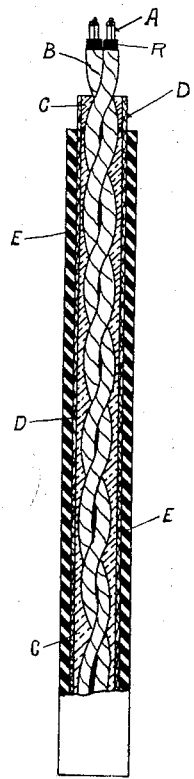
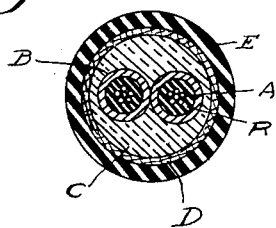
Inventor:
E. A. Bayles
by
Atty Patented Apr. 28, 1925.

1,535,711

UNITED STATES PATENT OFFICE.

ERNEST A. BAYLES, OF HELSBY, ENGLAND, ASSIGNOR TO BRITISH INSULATED & HELSBY CABLES LIMITED, OF PRESCOT, ENGLAND (A LIMITED LIABILITY COMPANY REGISTERED UNDER THE LAWS OF ENGLAND).

MANUFACTURE OF ELECTRIC CABLES.

Application filed April 10, 1924. Serial No. 705,699.

*To all whom it may concern:*

Be it known that I, ERNEST ARTHUR BAYLES, a subject of the King of England, and residing at Helsby, in the county of Chester, England, have invented Improvements in or Connected with the Manufacture of Electric Cables, of which the following is a specification.

This invention has reference to electric cables and more particularly to those in which the conductors, cores, or wires are covered and insulated by soft india rubber.

It has been proposed to enclose a rubber covered conductor within a covering of hard rubber or ebonite or the like, and to vulcanize properly both the soft and the hard covering, which is facilitated or made possible by the soft rubber covering of the wire having a low sulphur content, and the outer rubber compound covering having a relatively large sulphur content, and a vulcanizing accelerating substance, the whole being heated and vulcanized together until the core insulation and outer covering are properly vulcanized.

This method of making electric conductors is satisfactory in the case of soft rubber insulated single core conductors, but if attempted to be applied to the making of multi-core or multi-wire cables, it would be in some respects unsatisfactory, difficult of manipulation, and rather expensive; namely, if in the process of manufacture, several cores or conductors were covered with rubber in its soft state, and they are to be enclosed in a common sheathing of hard rubber or the like their manipulation would be difficult; for instance, in the laying up of the rubber covered conductors by twisting in the desired way for producing non-inductive effects required in multi-core cables the operation would be difficult, and faulty construction would be engendered; while subsequently, in practice or use, the manipulation will be troublesome. In operation of vulcanizing the twisted soft rubber covered conductors, they would be very liable to stick and become one; and furthermore the ends of the conductors could not be opened out separately, and the conductors might have to be bared, which would be liable to lead to defects and difficulty of manipulation in making connections of junctions, naked wires being very inconvenient and objectionable.

Now the object of this invention is to provide a manner or method of manufacturing a multi-core or multi-wire rubber covered cable, and the production of a finished cable, enclosed within a hard rubber ebonite or like covering, by which the defects above referred to are avoided, and an improved cable is produced, by which, firstly, the making of the cable is more easily and simply effected, and at a lower cost, and, secondly, that in the manipulation of the cable in installing in buildings and the like, and making joints and the like, it affords facilities, namely, where joints or junctions are to be made, they shall be capable of being easily and cheaply effected, and the conductor should be fully protected without the use of a metal conduit, in addition to the obviation of the necessity of the use of junction boxes at bends and the like.

A multi-core cable having the characteristics just described, and manner of making it, is set forth in the following statement.

The several cores or conductors are covered with soft rubber, and then are wrapped or covered with a covering of linen or like tape, and these taped cores are laid up and twisted together, which can be easily effected; and the whole may be "wormed" and wrapped together as a cable by tape windings.

The finished cores, bound together, are enclosed in the hard rubber, ebonite or like compound covering, by extruding it over them in suitable machinery; and then the cable is vulcanized for from say three to five hours, by which while the sheath is fully and properly vulcanized, the soft rubber of the cores is not overvulcanized or in effect impaired.

In some cases, the finished cores are singly slightly or partially vulcanized, which avoids softness during manipulation of the cable.

The hard rubber mixture or compound will in some cases, have a suitable proportion in it of a material of known kind which accelerates the vulcanization of same; and when vulcanized, the vulcanization of both the sheath and cable of cores is of the required degree of completeness, the soft rubber having in it no accelerator; and in some cases, the vulcanization of the soft rubber may be retarded by using in it some retarding substance of known kind.

In the cable as described, the hard rubber or ebonite sheet constitutes a conduit; and while the cores are fully insulated, and reliance on the conduit for insulation is not required, nevertheless in the case of one of the conductors being damaged, the conduit serves to insulate it, and no harm takes place.

In using such a cable in wiring installations in buildings and the like, no joints and connections of the conduits as are usually necessary, are required; as by warming the conduit the cable may be easily bent, and afterwards hardens; and so far as manufacture and transit are concerned, when warm it will coil or wind on a drum, and then harden, and by warming it can be uncoiled or drawn off the drum and straightened.

An example of a cable constructed in accordance with the method described is shown in the accompanying drawings, in which:

Fig. 1 is a vertical sectional view of the improved cable, parts being in elevation, Fig. 2 is an enlarged transverse section of the same.

In this example, the cores A consist of a number of wires each, and before laying up each core is covered with a covering of soft rubber R applied in any known suitable way, and they are then covered with covering of linen or like tape B, and when so covered are laid up and twisted together. The twisted or laid up conductors, may be covered or embedded in a suitable insulation compound or filling C, and then are "wormed" and wrapped together as a cable by tape windings D, and the cores so taped and bound together are then enclosed in an outer covering or sheath E of hard rubber, ebonite, or the like, preferably by extruding it over them in suitable known machinery; after which the cable is vulcanized for from 3 to 5 hours, by which while the sheath E is fully and properly vulcanized, the soft rubber covering of the cores A is not over-vulcanized, or in effect impaired.

These multi-core cables may be made of circular, rectangular or polygonal form in section; or the conductors or cores may be laid side by side in the ebonite or hard rubber conduit, in more or less flat form; and the conduit may be made of ornamental form, and have the appearance of a moulding or moulded spline, and in some cases may have flanges for securing it to a surface; and in use, the different conductors can be readily separately opened out, and manipulated with ease.

The conduit will stand being screw threaded for screwing into fittings or boxes, and joints where requisite.

What is claimed is:—

The manufacture of electric cables by initially covering the cores with rubber, covering the same with tape, laying up together the said taped cores, wrapping these cores together as a cable by tape windings, enclosing the cores in an outer rubber covering, and subjecting the cable to vulcanization in a manner to fully vulcanize the outer rubber covering while avoiding undue vulcanization of the initial rubber covering.

In testimony whereof I have signed my name to this specification in the presence of two subscribing witnesses.

ERNEST A. BAYLES.

Witnesses:
F DE SALS GYSAGHT.
MABEL PECK.